(12) United States Patent
Johnston et al.

(10) Patent No.: US 11,561,532 B2
(45) Date of Patent: Jan. 24, 2023

(54) SYSTEMS AND METHODS FOR METERED AUTOMATION CONTROLLER FUNCTIONALITY

(71) Applicant: Rockwell Automation Technologies, Inc., Mayfield Heights, OH (US)

(72) Inventors: David Allen Johnston, Painesville, OH (US); James Joseph Kay, Chardon, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 309 days.

(21) Appl. No.: 16/906,080

(22) Filed: Jun. 19, 2020

(65) Prior Publication Data
US 2021/0397162 A1 Dec. 23, 2021

(51) Int. Cl.
| | |
|---|---|
| *G05B 19/418* | (2006.01) |
| *G06Q 20/40* | (2012.01) |
| *H04L 9/08* | (2006.01) |
| *H04L 9/32* | (2006.01) |

(52) U.S. Cl.
CPC ... *G05B 19/4185* (2013.01); *G05B 19/41865* (2013.01); *G05B 19/41885* (2013.01); *G06Q 20/401* (2013.01); *H04L 9/0819* (2013.01); *H04L 9/3263* (2013.01)

(58) Field of Classification Search
CPC ............ G05B 19/0423; G05B 19/4185; G05B 19/41865; G05B 19/41885; G05B 2219/25257; G06F 21/10; G06F 21/105; G06F 21/12; G06F 21/121; G06Q 20/401; G06Q 2220/10; G06Q 30/018;
(Continued)

(56) References Cited

U.S. PATENT DOCUMENTS

| | | |
|---|---|---|
| 5,758,069 A | 5/1998 | Olsen |
| 7,913,295 B2 | 3/2011 | Myers et al. |
| 8,244,640 B2 | 8/2012 | Venkatachalam et al. |

(Continued)

FOREIGN PATENT DOCUMENTS

| | | | | |
|---|---|---|---|---|
| EP | 3062276 A1 | 8/2016 | | |
| WO | WO-0177795 A2 | * 10/2001 | ............. | G06F 21/10 |

OTHER PUBLICATIONS

Extended European Search Report for Application No. 21178005.1 dated Nov. 17, 2021, 8 pages.

*Primary Examiner* — Theodore C Parsons
(74) *Attorney, Agent, or Firm* — Fletcher Yoder, P.C.

(57) ABSTRACT

Metering automation controller functionality includes accessing a project code that defines one or more operations of an industrial automation controller, analyzing the project code to identify one or more capabilities of the industrial automation controller that are utilized by the one or more operations, generating a file indicative of the one or more capabilities of the industrial automation controller, transmitting the file to a server that generates a certificate for authorizing the industrial automation controller to execute the project code, receiving the certificate from the server that identifies the file and an authorization for the industrial automation controller to execute the project code to perform the one or more operations, and transmitting the project code, the file, and the certificate to the industrial automation controller for execution.

20 Claims, 7 Drawing Sheets

(58) Field of Classification Search
CPC ............... G06Q 30/0283; G06Q 30/06; H04L 2463/103; H04L 63/102; H04L 9/0819; H04L 9/3263
See application file for complete search history.

(56) References Cited

U.S. PATENT DOCUMENTS

| | | | |
|---|---|---|---|
| 8,738,894 B2 | 5/2014 | Batke et al. | |
| 10,285,538 B1 | 5/2019 | Canter | |
| 2002/0138745 A1* | 9/2002 | Cognigni | G06F 21/10 713/189 |
| 2004/0268120 A1* | 12/2004 | Mirtal | G06F 21/10 726/30 |
| 2007/0107067 A1* | 5/2007 | Fountian | G06F 21/10 726/33 |
| 2007/0208440 A1 | 9/2007 | Bliss et al. | |
| 2014/0090020 A1* | 3/2014 | Meiners | G06F 21/6209 726/4 |
| 2014/0337924 A1* | 11/2014 | Smith | H04L 63/10 726/4 |
| 2016/0252895 A1* | 9/2016 | Case | G05B 15/00 700/12 |
| 2017/0041794 A1 | 2/2017 | Lee et al. | |
| 2017/0063268 A1* | 3/2017 | da Silva | G05B 13/02 |
| 2020/0348654 A1* | 11/2020 | Anand | G05B 19/41865 |
| 2020/0401394 A1* | 12/2020 | Tunkkari | G05B 19/0426 |

* cited by examiner

SYSTEMS AND METHODS FOR METERED AUTOMATION CONTROLLER FUNCTIONALITY

BACKGROUND

The present disclosure relates generally to controllers of industrial automation system. More specifically, the present disclosure relates to controlling which functionality of a controller in an industrial automation system is available.

Industrial automation systems may be used to provide automated control of one or more actuators. Specifically, a controller may receive power from a power source and output a conditioned power signal to an actuator to control movement of the actuator. Typically, controllers for industrial automation systems are available for sale (either individually, as a component within an industrial automation system, or as a subcomponent within an industrial automation component) from manufacturers or sellers with a limited number of combinations of features and/or capabilities. As such, a customer may be unable to find a controller having a specific combination of features he or she seeks. The customer may end up paying a higher price to purchase a controller having one or more extra features and/or capabilities that he or she does not plan on utilizing. Similarly, the customer may end up purchasing a controller that lacks one or more of the particular features he or she sought and adapting an application for operating the controller to accommodate the purchased controller. Further, once a customer purchases a controller, the customer may be locked into the features of the controller at the time of purchase, without the ability to add or remove features. Accordingly, it may be desirable to give customers the ability to customize the features of the controller before purchase and add or remove features after the controller has been purchased.

BRIEF DESCRIPTION

In one embodiment, a tangible, non-transitory, computer-readable medium comprising program instructions that, when executed by a processor, cause the processor to access a project code that defines one or more operations of a controller, analyze the project code to identify one or more capabilities the controller that are utilized by the one or more operations, generate a file indicative of the one or more capabilities of the controller, transmit the file to a server that generates a certificate for authorizing the controller to execute the project code, receive the certificate from the server that identifies the file and an authorization for the controller to execute the project code to perform the one or more operations, and transmit the project code, the file, and the certificate to the controller for execution.

In another embodiment, a method includes receiving, one or more inputs defining a project, analyzing the project to identify one or more capabilities of a controller that are utilized by the project, generating a file comprising the one or more capabilities of the controller that are utilized by the project, transmitting the file to a server, receiving a certificate from the server, wherein the certificate identifies the manifest and an authorization for the controller to execute the project associated with the file, transmitting the project, the file, and the certificate to the controller for execution.

In yet another embodiment, a system includes a computing device and a controller disposed behind a firewall. The computing device is configured to analyze a project code to identify one or more capabilities of a controller that are utilized by the project code, generate a manifest comprising the one or more capabilities of the controller that are utilized by the project, transmit the manifest to a server, wherein the server is configured to generate a certificate for authorizing the controller to execute the project code, receive a certificate from the server identifying the manifest and an authorization for the controller to execute the project code to perform the one or more operations, and transmit the project code, the manifest, and the certificate to the controller. The controller is configured to receive, from the computing device, the project code, the manifest, and the certificate, decrypting the certificate, verify that the certificate matches the manifest and the project code, and execute the project code.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

An industrial automation system may utilize a controller, to receive power from a power source and output a conditioned power signal to an actuator to control movement of the actuator. The controller may be a stand-alone control unit that controls multiple industrial automation components (e.g., a motor control center or MCC), a controller that controls the operation of a single automation component, or a subcomponent within a larger industrial automation system. Controllers are typically available from manufacturers or sellers having a limited number of combinations of features. Accordingly, a customer looking for a controller with a particular combination of features that does not match a model available from a manufacturer or seller may settle for a model of controller that is closest to the particular combination of features they seek. As such, the customer may pay a higher price to purchase a controller having all of the particular features they seek, but also one or more features and/or capabilities that they do not plan on utilizing. Alternatively, the customer may purchase a controller that lacks one or more of the particular features for which they were looking and adapting other aspects of the industrial automation system to accommodate the purchased controller. Further, once a controller has been purchased, the customer may be limited to the features of the controller at the time of purchase without the ability to add or remove features.

The disclosed techniques enable a customer to customize the features/capabilities of a controller to his or her specific industrial automation project (e.g., a file or portion of programmatic code that define operations and/or provide operations guidelines for the controller in controlling an industrial automation system or component during performance of one or more tasks or processes) and then add or remove (e.g., meter) features/capabilities of the controller on a project-by-project basis, for a specified amount of time, a specified number of project cycles, or as otherwise needed. Specifically, a computing system operated by the customer analyzes an industrial automation project to identify which controller features/capabilities are utilized by the industrial automation project and generates a manifest for the industrial automation project identifying the controller features/ capabilities utilized by the industrial automation project. The manifest may identify, for example, a number of axes of motion that are used, a number of Ethernet nodes that are used, an identity of languages used, what, if any, premium instructions are being used (e.g., PID control loop, other control loop, features developed by the seller, etc.), a number of connections that are used, whether machine learning and/or artificial intelligence is used, whether analytics are being used, and the like. The manifest is sent to a remote/ cloud server associated with a manufacturer/seller of the controller or other service provider. The remote/cloud server determines which controller features/capabilities utilized by the industrial automation project and identified in the manifest are not available to the customer. For example, the remote/cloud server may review past purchases by the customer and/or existing licensing agreements to identify which features/capabilities are not free and have not been purchased. The customer may then purchase access to the unavailable features/capabilities. Once the customer has access to the controller features/capabilities utilized by the industrial automation project and identified in the manifest, the remote/cloud server generates an encrypted certificate that is sent back to the computing device. The computing device sends the industrial automation project, the manifest, and the certificate to the controller. The controller decrypts the certificate, validates the certificate (e.g., confirms that the industrial automation project, the manifest, and the certificate all match one another). Upon validation of the certificate, the controller runs or executes the industrial automation project. In some embodiments, the controller may collect data during execution of the industrial automation project that is transmitted back to the computing device following the execution of the industrial automation project.

Figure 1:
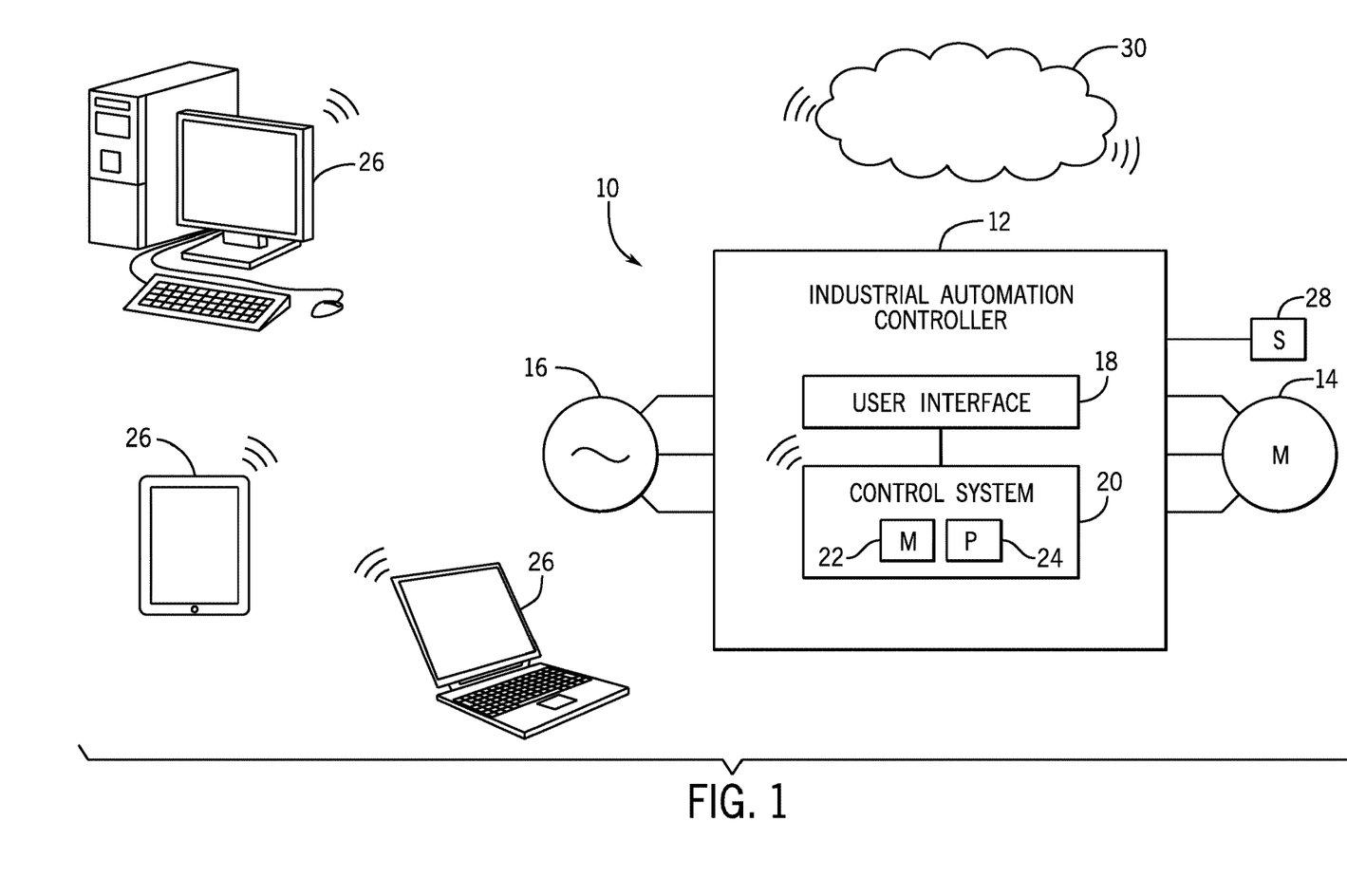
FIG. 1 illustrates a schematic view of an industrial automation system, including a controller, a computing device, and a remote server, in accordance with embodiments presented herein.

By way of introduction, FIG. 1 is a schematic view of an industrial automation system 10. As shown, the industrial automation system 10 includes a controller 12 and an actuator 14 (e.g., a motor). The industrial automation system 10 may also include, or be coupled to, a power source 16. The power source 16 may include a generator or an external power grid. The controller 12 may be a stand-alone control unit that controls multiple industrial automation components (e.g., a plurality of motors 14), part of a motor control center (MCC), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22 and configured to be executed by the processor 24) to provide signals for driving the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software configuration or firmware code that may be loaded onto the internal memory 22 of the control system 20 (e.g., via a computing device 26) or programmed via the user interface 18 of the controller 12. The firmware of the control system 20 may respond to a defined set of operating parameters. The settings of the various operating parameters determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) like control programming, and the like.

In some embodiments, the controller 12 may be communicatively coupled to one or more sensors 28 for detecting operating temperatures, voltages, currents, pressures, flow rates, etc. within the industrial automation system 10. With feedback data from the sensors, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26, or using website accessible via a browser. The user may define the industrial automation project by writing code, interacting with a visual programming interface, inputting or selecting values via a graphical user interface, providing some other inputs, or some combination thereof. The computing device 26 may send a project to the controller 12 for execution. Execution of the industrial automation project causes the controller 12 to control the industrial automation system through performance of one or more tasks and/or processes. In some applications, the controller 12 may be disposed behind a firewall, such that the controller does not have internet access and is not in communication with any devices outside the firewall, other than the computing device. 26. As previously discussed, the controller may collect feedback data during execution of the project, which may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be in communication with a cloud server 30 or remote server via the internet, or some other network. In the instant embodiment, the cloud server 30 is operated by the manufacturer of the controller 12. However, in other embodiments, the cloud server may be operated by a seller of the controller, a service provider, etc. The cloud server 30 may be used to help customers create and/or modify projects, to help troubleshoot any problems that may arise with the controller 12, or to provide other services (e.g., project analysis, enabling, restricting capabilities of the controller 12, data analysis, controller firmware updates, etc.). The remote/cloud server 30 may be one or more servers operated by the manufacturer, seller, or service provider of the controller 12. The remote/cloud server 30 may be disposed at a facility owned and/or operated by the manufacturer, seller, or service provider of the controller 12. In other embodiments, the remote/cloud server 30 may be disposed in a datacenter in which the manufacturer, seller, or service provider of the controller 12 owns or rents server space. In further embodiments, the remote/cloud server 30 may include multiple servers operating in one or more data center to provide a cloud computing environment.

Figure 2:
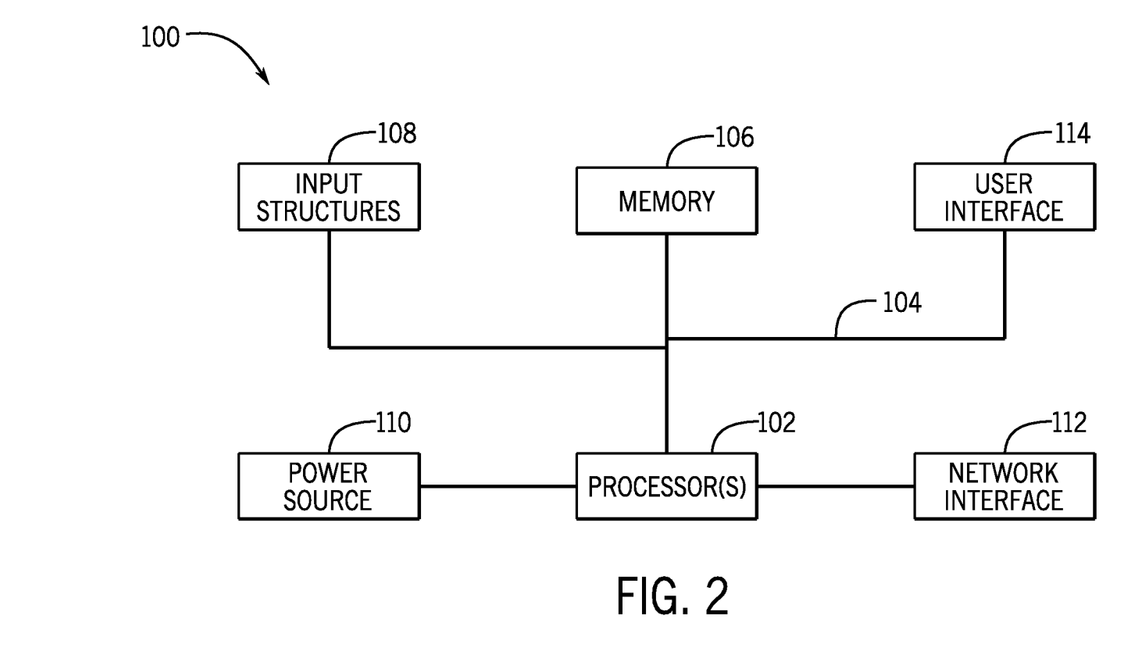
FIG. 2 illustrates a block diagram of example components that could be used as the computing device and/or the remote server of FIG. 1, in accordance with embodiments presented herein.

FIG. 2 illustrates a block diagram of example components of a computing device 100 that could be used as the computing device 26 and/or the cloud/remote server 30 shown in FIG. 1. As used herein, a computing device 100 may be implemented as one or more computing systems including laptop, notebook, desktop, tablet, HMI, or workstation computers, as well as server type devices or portable, communication type devices, such a cellular telephones, and/or other suitable computing devices.

As illustrated, the computing device 100 may include various hardware components, such as one or more processors 102, one or more busses 104, memory 106, input structures 108, a power source 110, a network interface 112, a user interface 114, and/or other computer components useful in performing the functions described herein.

The one or more processors 102 are, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines, including volatile memory, non-volatile memory, or any combination thereof. Although shown for convenience as a single block in FIG. 2, the memory 106 may encompass various discrete media in the same or different physical locations. The one or more processors 102 may access data in the memory 106 via one or more busses 104.

The input structures 108 are used to allow a user to input data and/or commands to the device 100 and may include mouses, touchpads, touchscreens, keyboards, controllers, and so forth. The power source 110 can be any suitable source for providing power to the various components of the computing device 100, including line and battery power. In the depicted example, the device 100 includes a network interface 112. Such a network interface 112 may allow communication with other devices on a network using one or more communication protocols. In the depicted example, the device 100 includes a user interface 114, such as a display configured to display images or data provided by the one or more processors 102. The user interface 114 may include, for example, a monitor, a display, and so forth. As will be appreciated, in a real-world context a processor-based system, such as the computing device 100 of FIG. 2, may be employed to implement some or all of the present approach, such as performing the functions of the computing device 26 and/or the cloud/remote server 30 shown in FIG. 1.

Returning to FIG. 1, typically, a seller of controllers 12 may only offer a limited number of models of controllers 12 having pre-determined combinations of features/capabilities. For example, if a customer wishes to purchase a controller 12 having a specific combination of features and/or capabilities, but the seller does not sell a controller 12 having the specific combination of features and/or capabilities, the customer may end up paying a higher price for a controller 12 having all of the features and/or capabilities sought, as well as one or more additional features and/or capabilities that the customer does not plan on using. Alternatively, the customer may end up purchasing a controller 12 that lacks one or more particular features and/or capabilities that the customer sought, and determining how to make the purchased controller 12 work in their application. Additionally, when a customer purchases a controller 12, typically, particular features and/or capabilities of the controller 12 cannot be turned on or off. Accordingly, a customer may end up paying to use particular features and/or capabilities of the controller 12 for the entire life of the controller 12, even though one or more of the particular features and/or capabilities of the controller 12 may not be used regularly, or even used at all during the life of the controller 12. Further, after the controller 12 has been purchased, the customer may not have the option to add particular features and/or capabilities to the controller 12. Accordingly, the disclosed techniques include using certificates generated by the cloud server 30 and verified by the controller 12 to enable customers to customize features and/or capabilities of the controller 12, and to add and/or remove features and/or capabilities to the controller 12, such that the customer only pays for features and/or capabilities of the controller 12 that are being used. Accordingly, customizing controller 12 features/capabilities, adding controller 12 features/capabilities, and/or removing controller 12 features/capabilities may is referred to herein as metering controller functionality. Particular controller 12 features/capabilities may be available to particular projects, particular customer, for a set period of time (a specific duration, before some date/time, after some date/time, and so forth), for a set number of cycles, and the like.

Figure 3:
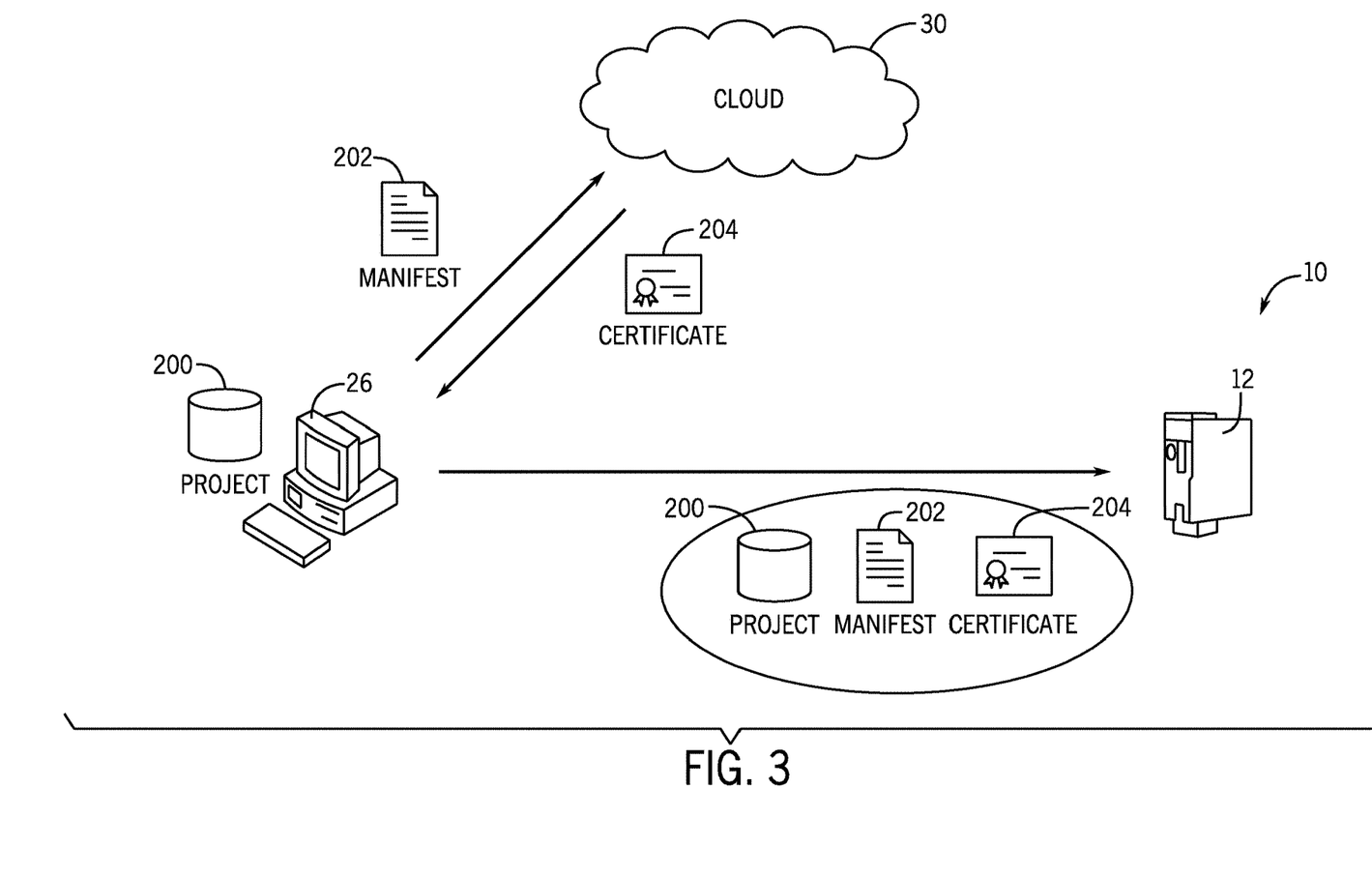
FIG. 3 illustrates a schematic of a system for metering controller functionality, in accordance with embodiments presented herein.

FIG. 3 is a schematic of a system for metering controller 12 functionality. As previously described, the computing device 26 is used to generate a project 200 using a native software application running on the computing device 26 or using a webpage accessed via a browser. The project 200 may be created and/or edited by writing code, interacting with a visual programming interface, inputting or selecting values via a graphical user interface, providing some other inputs, or some combination thereof. The project 200 is a portion of code defining how the controller 12 and one or more industrial automation components within an industrial automation system 10 are to operate during performance of one or more industrial automation tasks. After the project 200 has been finalized, the computing device 26 performs an analysis of the project 200 to determine which features and/or capabilities of the controller 12 are utilized by the project 200. This may include, for example, the number of axes of motion used, number of Ethernet nodes used, languages used, what, if any, premium instructions are being used (e.g., PID control loop, other control loop, features developed by the seller, etc.), number of connections used, whether machine learning and/or artificial intelligence is used, whether analytics are being used, central processing unit (CPU) performance, amount of memory available, safety level (e.g., safety integrity level 2, safety integrity level 3, and so forth), redundancy capability, and the like. The computing device 26 generates a manifest 202 that indicates which features and/or capabilities are being utilized and transmits the manifest 202 to the cloud server 30. The manifest 202 may include, for example, a data file listing the features and/or capabilities utilized by the project 200, a data file having fields that correspond a set list of features and/or capabilities and indicating in each field whether the respective feature/capability is used, and for certain fields, how much of that feature/capability is used, what level of the feature/capability is used, and/or how many times that feature/capability is used. In some embodiments, the manifest 202 may include a unique identity of a controller 12 on which the project 200 is authorized to run. Accordingly, a customer may choose to purchase a certificate 204 to run on a specific controller 12 or controllers, or to run on a limited number of controllers 12. It should be understood, however, that other formats of the manifest are also envisaged. In the illustrated embodiment, the project 200 itself is not sent to the cloud server 30. Some customers may wish to keep various aspects of the project 200 private and thus, may not wish to send the project 200 to the cloud server 30. Accordingly, in the instant embodiment, the manifest 202 may merely indicate which features and/or capabilities are being used by the project 200 and not the specific ways in which those features and/or capabilities are being used by the project 200. However, embodiments are envisaged in which the project 200 may be sent to the cloud server 30 with the manifest 202 (e.g., for project analysis, troubleshooting, help developing the project, etc.). Further, embodiments are envisaged in which the project 200 is sent to the cloud server 30 and the manifest 202 is generated by the cloud server 30.

The cloud server 30 cross checks past purchases, licensing agreements, etc. and determines what, if any, features and/or capabilities used by the project 200 are not free and have not been paid for. If there are features and/or capabilities that are not free and have not been paid for, the cloud server 30 generates a statement identifying the features and/or capabilities used by the project 200 that are not free and have not been paid for, the options for gaining access to those features and/or capabilities, and the costs associated with each option. The customer responds by selecting one or more of the options and providing payment, or promising to provide payment, for the selected option(s). In response to receiving the selection of the one or more of the options and the payment (e.g., lump sum, monthly payment, quarterly payment, annual payment, etc.), or in response to determining that all features and/or capabilities used by the project 200 are covered by past purchases and/or existing license agreements, the cloud server 30 generates and transmits a certificate 204 for the manifest 202 to the computing device 26. The certificate may be valid for a particular project, a particular duration of time, until an expiration date, after a start date, for a certain number of cycles, and so forth.

In the instant embodiment, the certificate 204 is an encrypted $X_{.509}$ certificate that includes a private key corresponding to a public key stored on the controller. Generally, a certificate 204 may include a public key or a private key and an identity (e.g., a host name, an entity, or an individual). The certificate 204 is signed by a trusted certificate authority. The certificate 204 may include, for example, a version number, a serial number, a signature algorithm ID, an issuer name, a validity period, a start date, and end date, subject name, subject public key info, subject public key, subject private key info, subject private key, issuer unique identifier, subject unique identifier, extensions, certificate signature algorithm, certificate signature, or some combination thereof. After the certificate 204 is signed, the public key may be used to validate documents signed using the corresponding private key. The certificate 204 is rejected if an unrecognized extension is encountered. In some embodiments, the signing authority may use a certificate revocation list to communicate that a certificate has been deemed invalid by the signing authority. Further, in embodiments having multiple certificate authorities, a certification path validation algorithm may be used to allow certificates 204 to be signed by intermediate certificates or signing authorities. However, it should be understood that the certificate 204 may utilize other known encryption and/or security standards and techniques for securing the certificate 204.

In some embodiments, the controller 12 may be purchased from a first entity, such as an original equipment manufacturer (OEM), by a second entity. The second entity may incorporate the controller 12 into a product (e.g., a turn-key industrial automation system 10 for a particular application), and then sell the product to a third entity (e.g., an end customer). In such an embodiment, there may be multiple certificates 204. For example, the first entity may sell the controller 12 to the second entity having a first set of capabilities. The second entity then packages the controller 12 into the product such that only a subset of the first set of capabilities are available for use and sells the product to the third entity. Thus, a certificate 204 may be created for each transaction along the chain of entities that specifies the capabilities of the controller 12 as governed by the terms of the transaction. For example, a first certificate 204 may identify the first set of capabilities as being available for use by the second entity based on the terms of the transaction between the first and second entities. A second certificate 204 may identify the subset of the first set of capabilities as being available for use by the third entity based on the terms of the transaction between the second and third entities. It should be understood that this certificate chain may propagate through additional levels of transactions between entities. Accordingly, embodiments are envisaged in which there may be three, four, five, or more certificates 204. In such an embodiment, the controller 12 may verify multiple certificates 204 before executing the project 200. For example, the controller 12 may verify that the issuer of each certificate 204, except for the last issuer, matches the subject of the next certificate 204 in the chain. Each certificate 204, except for the last certificate 204 in the chain, is signed by a key corresponding to the next certificate 204 in the chain, such that the signature of one certificate 204 can be verified using the key contained in the subsequent certificate 204. The last certificate 204 in the chain is called the trust anchor because the certificate 204 was delivered from a trustworthy source or through some trustworthy procedure.

In the embodiment described above with two certificates 204 and three entities, the third entity, the end customer, may decide that they would like to use a controller 12 functionality beyond the first subset of capabilities of the first set of capabilities. Accordingly, the third entity may pay the second entity for access to the additional capabilities if those capabilities are within the first set of capabilities. If the additional capabilities are outside of the first set of capabilities, then the second and/or third entity may pay the first entity for access for the additional capabilities, resulting in new certificates.

The computing device 26 transmits the project 200, the manifest 202, and the certificate 204 to the controller 12. The controller 12 uses a copy of the corresponding public key stored in its memory to decrypt the certificate 204 and confirm that the certificate 204 matches the manifest 202. In some embodiments, the controller 12 may be preprogrammed with the public key stored in its memory by the manufacturer, the seller, or some other entity. In other embodiments, the public key may have been received via a firmware update or some other network communication.

In addition to providing or updating public keys, firmware updates may be used to "retrofit" legacy controllers 12 in the field to add functionality and increase capabilities. For example, a firmware update may provide an installed controller 12 with new analytics capabilities, new algorithms for use, new control loops to implement, and the like.

If the certificate 204 matches the manifest 202, the controller 12 runs or executes the project. The controller 12 does not evaluate which features have been paid for, which features are included with past purchases, or which features have been licensed. As long as a valid certificate 204 has been provided that matches the manifest 202, the controller 12 runs the project 200.

Figure 4:
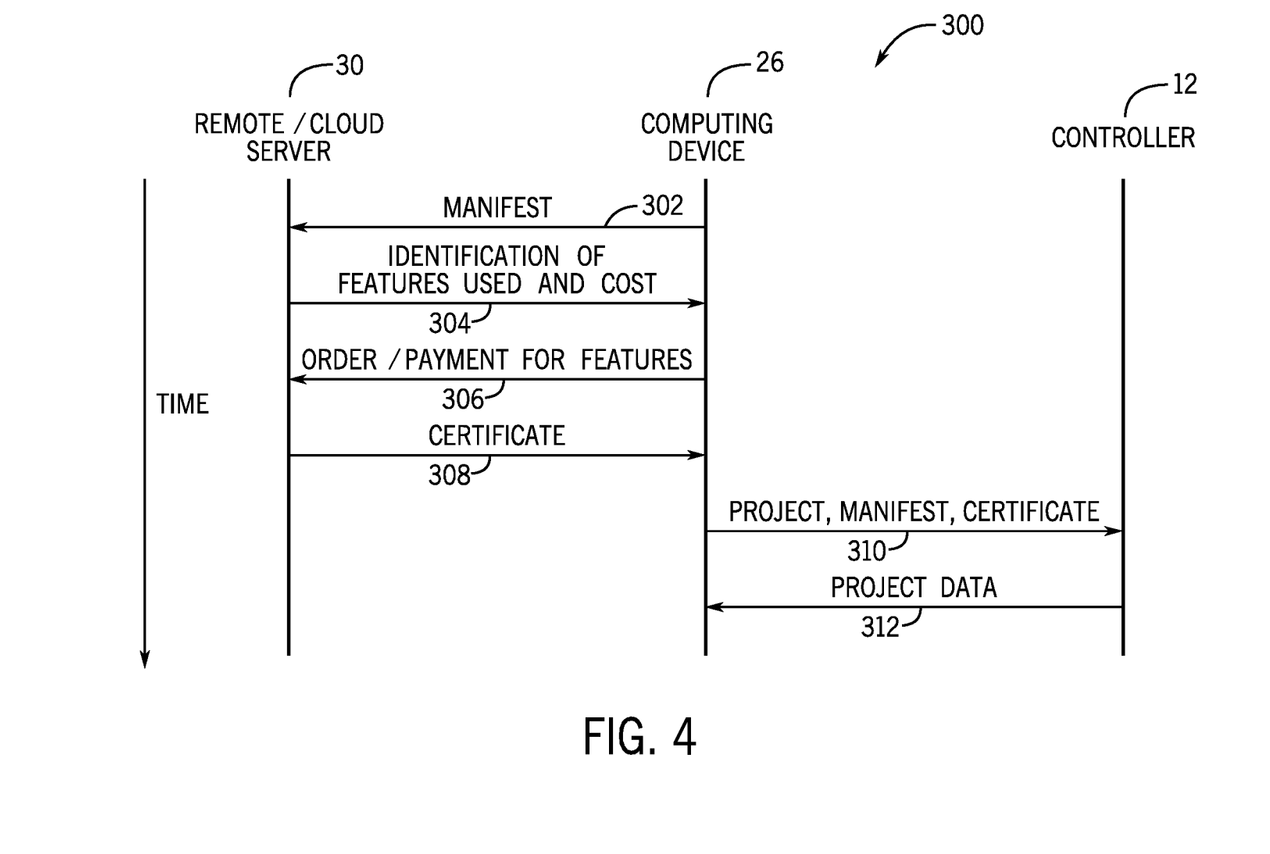
FIG. 4 illustrates a flow chart of a process for metering controller functionality, in accordance with embodiments presented herein.

FIG. 4 is a flow chart of a process 300 for metering controller 12 functionality. As previously described, the project is created or edited on the computing device 26. The computing device 26 analyzes the project to generate a manifest identifying various controller features and/or capabilities used by the project. At 302, the manifest is transmitted to the cloud server 30. The cloud server 30 analyzes the manifest and compares the controller features and/or capabilities identified by the manifest to past purchases, licensing agreements, etc. and determines which, if any, controller features and/or capabilities identified by the manifest are not free and have not been purchased. If there are features and/or capabilities that are purchased, the cloud server 30 generates a statement identifying the features and/or capabilities used by the project 200 that have not been purchased, the options for gaining access to those features and/or capabilities, and the costs associated with each option. At 304, the statement is transmitted to the computing device 26. At 306, the computing device 26 sends an identification of one or more options and/or payment for the features and/or capabilities that have not been purchased. The cloud server 30 generates a certificate (e.g., an encrypted X.509 certificate) for the manifest, which includes a private key and transmits the certificate to the computing device at 308. At 310, the computing device 26 transmits the project, the manifest, and the certificate to the controller 12. The controller 12 uses a copy of the corresponding public key stored in its memory to decrypt the certificate 204 and confirm that the certificate matches the manifest 202. If the certificate 204 matches the manifest 202, the controller 12 runs the project. In some embodiments, at 312, the controller may transmit data collected during the running of the project to the computing device 26. The data may include, for example, one or more execution times, one or more alerts, one or more error messages, one or more alarm conditions, one or more temperatures, one or more pressures, one or more flow rates, one or more motor speeds, one or more voltages, one or more frequencies, and so forth.

Figure 5:
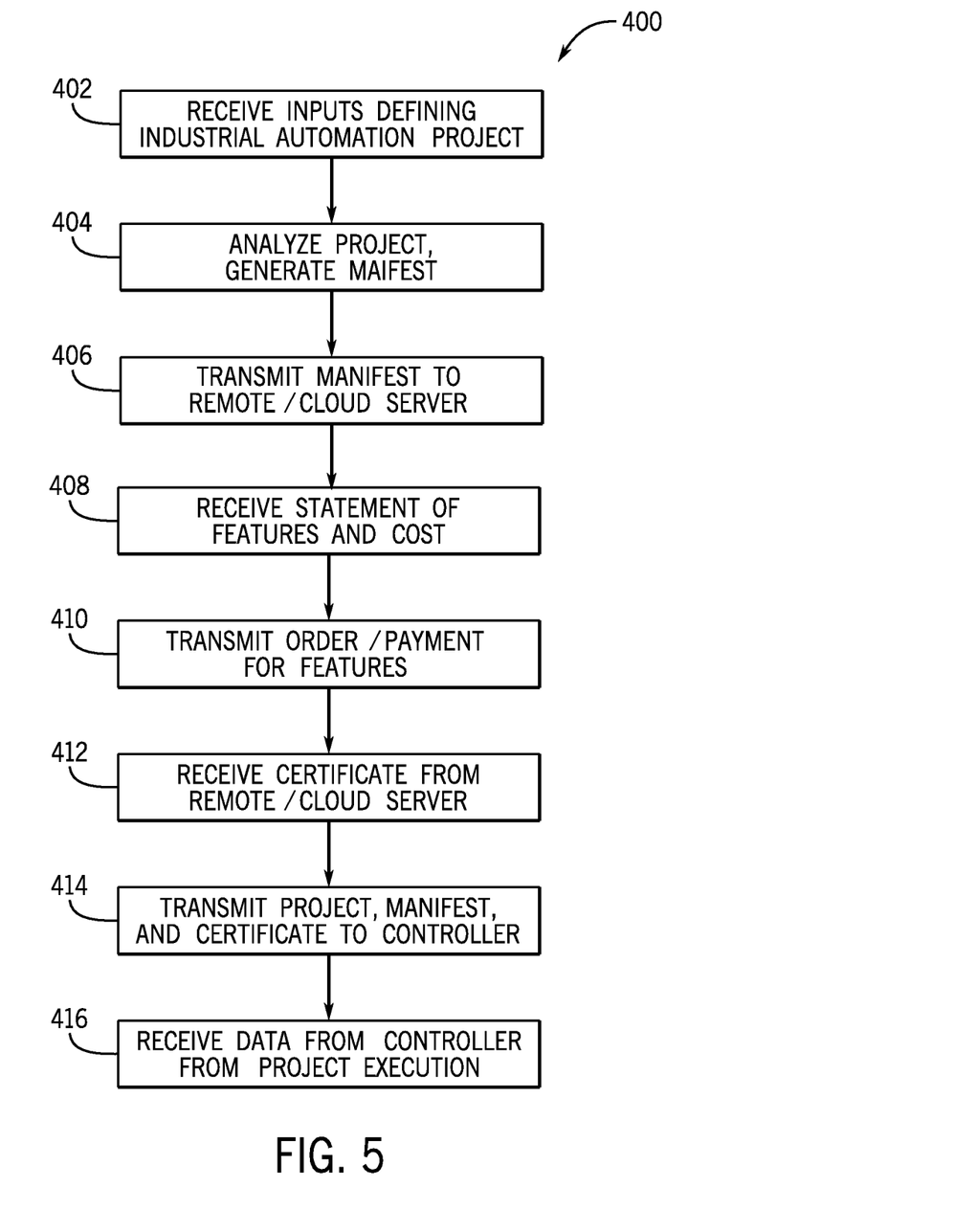
FIG. 5 illustrates a flow chart of a process for metering controller functionality from the perspective of the computing device of FIG. 1, in accordance with embodiments presented herein.

FIG. 5 is a flow chart of a process 400 for metering a controller functionality from the perspective of the computing device 26. At block 402, inputs are received that define an industrial automation project. The inputs may include programmatic code, inputs to a visual programming environment, and/or inputs to a graphical user interface (GUI) setting thresholds, displacements, speeds, temperatures, voltages, currents, or controlling other aspects of the industrial automation system to perform one or more industrial automation tasks or processes.

At block 404, the project is analyzed and a manifest is generated. The analysis involves determining controller features and/or capabilities that are utilized by the project. For example, the analysis may determine a number of axes of motion that are used, a number of Ethernet nodes that are used, an identity of languages used, what, if any, premium instructions are being used (e.g., PID control loop, other control loop, features developed by the seller, etc.), a number of connections that are used, whether machine learning and/or artificial intelligence is used, whether analytics are being used, and the like. The results of the analysis are included in the manifest. That is, the manifest identifies the controller features and/or capabilities that are utilized by the project. The analysis and/or generation of the manifest may be performed during, or in response to, executing one or more scripts. For example, the script may cause the processor to parse the program code that defines the project and apply one or more rules, or otherwise look for features of the code that indicate that specific controller features and/or capabilities are being used by the project. Because the manifest may not include specific information about exactly how the project uses the enumerated features and/or capabilities, a customer that may be reluctant to hesitant to transmit sensitive data (e.g., trade secrets, specific recipes, details about manufacturing processes, etc.) to a third party may feel comfortable transmitting the manifest to an external destination. At block 406, the manifest is transmitted to the remote/cloud server. In some embodiments, the manifest may be encrypted (e.g., using a public/private key scheme, or some other encryption techniques). In other embodiments, the manifest may be transmitted in an unencrypted form.

As previously discussed, in some embodiments, the analysis may be performed by the cloud server 30 rather than by the computing device 26. In such embodiments, the customer may transmit the project to the cloud server 30 to perform the analysis and generate a manifest, which is returned to the computing device 26, either with or separate from the certificate.

Upon receipt of the manifest, the cloud server 30 may cross-check past purchases and existing license agreements with the customer and identifies which controller features and/or capabilities in the manifest are not free and have not already been paid for. That is, the cloud server 30 generates and transmits for receipt by the computing device 26 (block 408), a statement of controller features and/or capabilities in the manifest that need to be paid for. In some embodiments, the statement may include options for acquiring the controller features and/or capabilities (e.g., lump sum, regular payment, package with other features/capabilities, etc.). At block 410, an order selecting one of the options from the statement and/or payment for the features and/or capabilities is transmitted to the remote server. In some embodiments, a promise to pay may be sent in lieu of payment. Further, in some embodiments, payment may be through a third-party payment service. Once all controller features and/or capabilities in the manifest that need to be paid for have been paid for, the cloud server 30 generates and sends a certificate for receipt by the computing device (block 412). In the instant embodiment, the certificate is an encrypted X.509 certificate that includes a private key that corresponds to a public key stored on the controller 12. However, it should be understood that the certificate may utilize other known encryption and/or security standards and techniques for securing the certificate 204. As previously discussed, in some embodiments, the cloud server 30 may send multiple certificates.

At block 414, the computing device 26 transmits the project, the manifest, and the certificate to the controller 12. The controller 12 verifies the certificate and the manifest and then runs the project. In some embodiments, the controller 12 may transmit data collected from running the project for receipt by the computing device (block 416).

Figure 6:
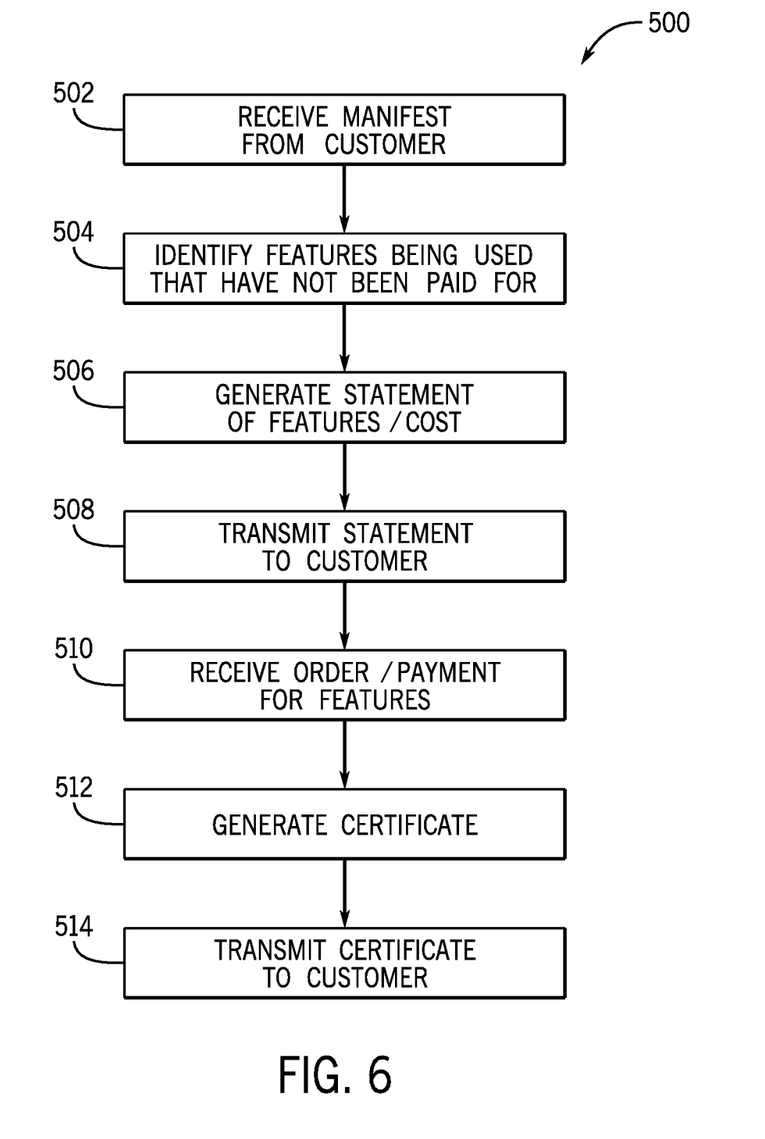
FIG. 6 illustrates a flow chart of a process for metering controller functionality from the perspective of the remote server of FIG. 1, in accordance with embodiments presented herein.

FIG. 6 is a flow chart of a process 500 for metering controller functionality from the perspective of the cloud/remote server 30. At block 502 the manifest is received from the customer. As previously discussed, in some embodiments, the cloud server 30 may receive the project from the customer and analyze the project to generate the manifest. The manifest identifies the controller features and/or capabilities are utilized by the project. For example, the manifest may identify how many axes of motion are used, how many Ethernet nodes are used, which languages used, what, if any, premium instructions are being used (e.g., PID control loop, other control loop, features developed by the seller, etc.), how many connections are used, whether machine learning and/or artificial intelligence is used, whether analytics are being used, etc.

At block 504, the features being used that are not purchased are identified. For example, previous purchases and existing licenses may be reviewed to identify the controller features and/or capabilities from the manifest that are not purchased. Options for accessing the controller features and/or capabilities are then identified and a cost associated with each option is calculated. At block 506, a statement is generated that identifies the various options for accessing the controller features and/or capabilities to which the customer does not already have access, as well as a cost associated with each option. The statement may identify, for example, individual controller features and/or capabilities, packages of controller features and/or capabilities, or available services (e.g., analytics) that include access to controller features and/or capabilities. Further, the statement may include options for a lump sum payment for use of a particular controller feature and/or capability by the customer for the instant project or any project in perpetuity, a monthly payment, a quarterly payment, an annual payment, and so forth.

At block 510, an order and/or payment is received from the customer. The order specifies one or more of the options set forth in the statement, as well as payment for the one or more selected options. In some embodiments, a promise to pay may be sent in lieu of payment. Further, in some embodiments, payment may be through a third-party payment service.

At block 512, a certificate is generated for the manifest. The certificate may be an encrypted certificate (e.g., a X.509 certificate) that includes a private key corresponding to a public key stored on the controller. At block 514, the certificate is transmitted to the computing device of the customer.

Figure 7:
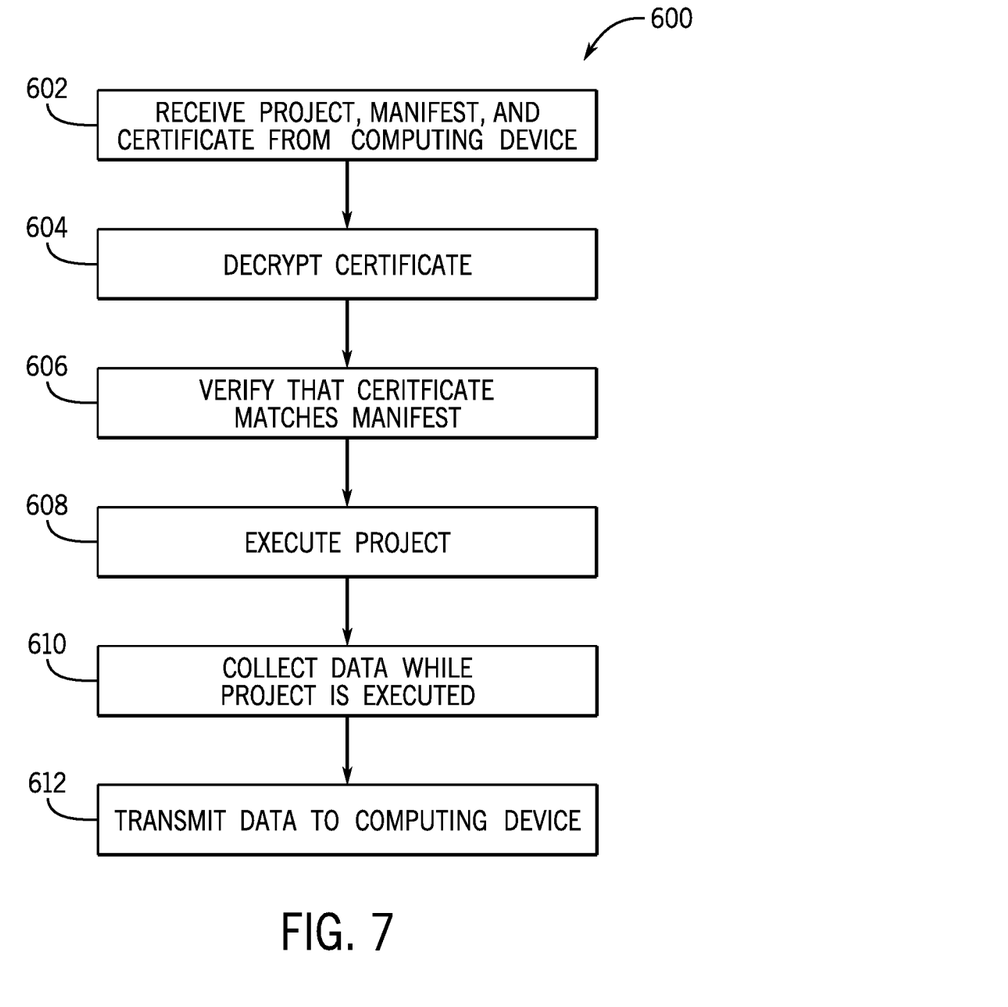
FIG. 7 illustrates a flow chart of a process for metering controller functionality from the perspective of the controller of FIG. 1, in accordance with embodiments presented herein.

FIG. 7 is a flow chart of a process 600 for metering controller functionality from the perspective of the controller 12. At block 602 the project, manifest, and certificate (e.g., encrypted X.509 certificate) are received from the computing device. At block 604, the certificate is decrypted. As previously described, the certificate includes a private key and the public key is stored in memory in the controller 12. The controller 12 may be preprogrammed with the public key by a manufacturer or seller. Alternatively, the public key may have been obtained via a firmware update to the controller 12 or some other communication method.

At block 606, the certificate is verified. That is, confirmation is made that the project matches the manifest and the manifest matches the certificate. The certificate, which was generated after the project was finalized and the manifest was generated, identifies the manifest. This may include a manifest number, some other alphanumeric character string associated with the manifest, or some other data that corresponds to the manifest. In some embodiments, the certificate may also identify the project. The certificate being encrypted and only enabling a project associated with a specific manifest to run prevents a customer from using a falsified certificate to run a project. As previously discussed, in some embodiments, there may be multiple certificates to verify.

At block 608, the project is executed. In some embodiments, data may be collected while the project is being executed (block 610). The data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. In such an embodiment, the data may be stored within the controller 12 and data analysis performed within the controller 12. In other embodiments, some or all of the data may be transmitted back to the computing device (block 612). Analysis may be performed on the computing device 26, or transmitted to the cloud server 30, or another third party, for analysis.

It should be understood that though FIGS. 5-7 are from the perspective of the computing device, the remote server, and the controller, respectively, embodiments are envisaged in which actions shown and described as performed by one component in FIGS. 5-7 may be performed by other components in the system. For example, actions described as performed by the computing device may be performed by the remote server or the controller, actions described as performed by the remote server may be performed by the computing device or the controller, and actions described as performed by the controller may be performed by the computing device or the remote server. Further, though the industrial automation component that is described as validating the certificate, the manifest, and the project, and then executing the project is the controller, it should be understood that a different industrial automation components, any other industrial equipment, or a collection of components operated by a control system may perform these tasks.

The disclosed techniques enable a customer to customize the features/capabilities of an industrial automation controller to his or her specific project and then add or remove features/capabilities of the controller on a project-by-project basis. Specifically, a computing system operated by the customer analyzes an industrial automation project to identify which controller features/capabilities are utilized by the project and generates a manifest for the project identifying the controller features/capabilities utilized by the project. The manifest is sent to a remote/cloud server associated with the manufacturer/seller of the controller or other service provider. The remote/cloud server determines which controller features/capabilities utilized by the project and identified in the manifest are not accessible to the customer. For example, the remote/cloud server may review past purchases by the customer and/or existing licensing agreements to identify which features/capabilities are not free and have not yet been paid for. The customer may then purchase access to the features/capabilities. Once the customer has access to the controller features/capabilities utilized by the project and identified in the manifest, the remote/cloud server generates an encrypted certificate that is sent back to the computing device. The computing device send the project, the manifest, and the certificate to the controller. The controller decrypts the certificate, validates the certificate (e.g., confirms that the project, the manifest, and the certificate all match). Upon validation of the certificate, the controller runs the project. In some embodiments, the controller may collect data during execution of the project that is transmitted back to the computing device following execution of the project.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A tangible, non-transitory, computer-readable medium comprising program instructions that, when executed by a processor, cause the processor to perform operations comprising:

accessing a project code stored in memory, wherein the project code is configured to define one or more operations of an industrial automation controller;

analyzing the project code to identify two or more capabilities of the industrial automation controller that are utilized by the one or more operations;

generating a file indicative of the two or more capabilities of the industrial automation controller;

transmitting the file to a remote server, wherein the remote server is configured to determine whether the industrial automation controller has access to the two or more capabilities, and generate a certificate for authorizing the industrial automation controller to execute the project code;

receiving the certificate from the remote server, wherein the certificate identifies the file and an authorization for the industrial automation controller to execute the project code to perform the one or more operations; and transmitting the project code, the file, and the certificate to the industrial automation controller for execution, wherein the industrial automation controller is configured to execute the project code in response to the certificate matching the file and the project code.

2. The tangible, non-transitory, computer-readable medium of claim 1, wherein analyzing the project code to identify the two or more capabilities comprises parsing the project code to identify two or more features of the project code indicative of the two or more capabilities.

3. The tangible, non-transitory, computer-readable medium of claim 2, wherein parsing the project code to identify the two or more features comprises executing a script that applies one or more rules to the project code to identify a number of axes of motion that are referenced by the project code, a number of Ethernet nodes that are referenced by the project code, a number of connections that are referenced by the project code, or a combination thereof.

4. The tangible, non-transitory, computer-readable medium of claim 1, the operations comprising receiving, from the remote server, a statement identifying:

at least one of the two or more capabilities of the industrial automation controller that is utilized by the project code that is not purchased; and a respective cost associated with gaining access to each of the at least one of the two or more capabilities that is not purchased.

5. The tangible, non-transitory, computer-readable medium of claim 4, wherein the statement identifies a plurality of options for gaining access to the at least one of the two or more capabilities.

6. The tangible, non-transitory, computer-readable medium of claim 5, the operations comprising:

transmitting, to the remote server, a selection of at least one of the plurality of options for gaining access to the at least one of the two or more capabilities and payment information for the selected at least one of the plurality of options for gaining access to the at least one of the two or more capabilities.

7. The tangible, non-transitory, computer-readable medium of claim 5, the operations comprising:

transmitting, to the remote server, a selection of at least one of the plurality of options for gaining access to the at least one of the two or more capabilities; and transmitting, to a third-party payment service, payment information for the selected at least one of the plurality of options for gaining access to the at least one of the two or more capabilities.

8. A method performed by a processor, comprising:

analyzing a project code to identify two or more capabilities of an industrial automation controller that are utilized by the project code;

generating a file comprising the two or more capabilities of the industrial automation controller that are utilized by the project code;

transmitting the file to a remote server, wherein the remote server is configured to determine whether the industrial automation controller has access to the two or more capabilities;

receiving a certificate from the remote server, wherein the certificate identifies the file and an authorization for the industrial automation controller to execute the project code associated with the file; and transmitting the project code, the file, and the certificate to the industrial automation controller for execution.

9. The method of claim 8, wherein analyzing the project code to identify the two or more capabilities comprises parsing the project code to identify two or more features of the project code indicative of the two or more capabilities.

10. The method of claim 9, wherein the two or more features comprise a number of axes of motion that are referenced by the project code, a number of Ethernet nodes that are referenced by the project code, a number of connections that are referenced by the project code, or a combination thereof.

11. The method of claim 8, wherein the industrial automation controller is configured to execute the project code in response to the certificate matching the file and the project code.

12. The method of claim 8, wherein the industrial automation controller is configured to decline to execute the project code in response to receiving the project code without the certificate.

13. The method of claim 8, comprising receiving, from the industrial automation controller, data collected during execution of the project code.

14. The method of claim 13, wherein the data comprises one or more execution times, one or more alerts, one or more error messages, one or more alarm conditions, one or more temperatures, one or more pressures, one or more flow rates, one or more motor speeds, one or more voltages, one or more frequencies, or a combination thereof.

15. A system, comprising:
a computing device configured to perform first operations comprising:
analyzing a project code to identify two or more capabilities of an industrial automation controller that are utilized by the project code;
generating a manifest comprising the two or more capabilities of the industrial automation controller that are utilized by the project code;
transmitting the manifest to a remote server, wherein the remote server is configured to determine whether the industrial automation controller has access to the two or more capabilities, and generate a certificate for authorizing the industrial automation controller to execute the project code;
receiving a certificate from the remote server, wherein the certificate identifies the manifest and an authorization for the industrial automation controller to execute the project code to perform one or more operations; and
transmitting the project code, the manifest, and the certificate to the industrial automation controller; and
the industrial automation controller, wherein the industrial automation controller is disposed behind a firewall, and wherein the industrial automation controller is configured to perform second operations comprising:
receiving, from the computing device, the project code, the manifest, and the certificate;
decrypting the certificate;
verifying that the certificate matches the manifest and the project code; and
executing the project code.

16. The system of claim 15, wherein the certificate comprises a private key, and wherein the certificate is decrypted using a public key stored in a memory of the industrial automation controller.

17. The system of claim 16, wherein the certificate comprises an X.509 certificate.

18. The system of claim 15, the second operations comprising:
collecting data during execution of the project code; and
transmitting the data to the computing device.

19. The system of claim 15, comprising the remote server, wherein the remote server is configured to perform third operations comprising:
receiving the manifest from the computing device;
determining that a customer associated with the computing device has access to the two or more capabilities of the industrial automation controller that are utilized by the project code;
in response to determining that the customer associated with the computing device has access to the two or more capabilities of the industrial automation controller, generating the certificate; and
transmitting the certificate to the computing device.

20. The system of claim 19, the third operations comprising:
determining at least one of the two or more capabilities of the industrial automation controller that are utilized by the project code that is not purchased;
generating a statement identifying:
the at least one of the two or more capabilities of the industrial automation controller that is utilized by the project code that is not purchased; and
a plurality of options for gaining access to the at least one of the two or more capabilities of the industrial automation controller that is utilized by the project code that is not purchased; and
a respective cost associated with gaining access to each of the at least one of the two or more capabilities of the industrial automation controller that is utilized by the project code that is not purchased;
transmitting the statement to the computing device; and
receiving, from the computing device:
a selection of at least one of the plurality of options for gaining access to the at least one of the two or more capabilities; and
payment information for the selected at least one of the plurality of options for gaining access to the at least one of the two or more capabilities.

* * * * *